United States Patent
Wang et al.

(10) Patent No.: US 10,498,219 B2
(45) Date of Patent: Dec. 3, 2019

(54) ADJUSTING SOURCE VOLTAGE BASED ON OPERATING VOLTAGE RESPONSE

(71) Applicant: QUALCOMM Incorporated, San Diego, CA (US)

(72) Inventors: Lingyun Wang, San Diego, CA (US); Yuan-cheng Pan, Saratoga, CA (US); Junmou Zhang, San Diego, CA (US); Nan Chen, San Diego, CA (US); Mohamed Waleed Allam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 14/918,163

(22) Filed: Oct. 20, 2015

(65) Prior Publication Data

US 2017/0110958 A1    Apr. 20, 2017

(51) Int. Cl.
| | |
|---|---|
| *H02M 1/14* | (2006.01) |
| *H02M 1/08* | (2006.01) |
| *H02M 3/156* | (2006.01) |
| *G06F 1/18* | (2006.01) |
| *G06F 1/20* | (2006.01) |
| *G06F 1/26* | (2006.01) |

(Continued)

(52) U.S. Cl.
CPC ............ *H02M 1/14* (2013.01); *G06F 1/189* (2013.01); *G06F 1/206* (2013.01); *G06F 1/26* (2013.01); *G06F 1/3206* (2013.01); *G06F 1/3296* (2013.01); *H02M 1/08* (2013.01); *H02M 3/156* (2013.01); *Y02D 10/172* (2018.01)

(58) Field of Classification Search
None
See application file for complete search history.

(56) References Cited

U.S. PATENT DOCUMENTS 5,963,023 A * 10/1999 Herrell .................... G06F 1/305
                                                    257/E23.067
6,835,579 B2    12/2004 Elward
(Continued)

OTHER PUBLICATIONS

International Search Report and Written Opinion—PCT/US2016/052696—ISA/EPO—Nov. 29, 2016.

*Primary Examiner* — Jared Fureman
*Assistant Examiner* — Joel Barnett
(74) *Attorney, Agent, or Firm* — Arent Fox, LLP and Qualcomm (57) ABSTRACT

An apparatus and a method to adjust a source voltage based on an operating voltage response are provided. The apparatus includes a circuit configured to change state from a first state to a second state comprising receiving an operating voltage from a power source through a power distribution network. The apparatus further includes a sensor configured to measure an operating voltage response to the circuit changing state to receiving the operating voltage. The apparatus further includes a control circuit configured to adjust a source voltage at the power source based on the operating voltage response measured by the sensor. The method includes changing a state to receiving an operating voltage from a power source through a power distribution network, measuring an operating voltage response to the changing state to receiving the operating voltage, and adjusting the source voltage at the power source based on the measured operating voltage response.

22 Claims, 8 Drawing Sheets

(51) Int. Cl.
   *G06F 1/3206*   (2019.01)
   *G06F 1/3296*   (2019.01)

(56) References Cited

U.S. PATENT DOCUMENTS

| | | |
|---|---|---|
| 6,937,971 B1 | 8/2005 | Smith et al. |
| 8,988,140 B2 | 3/2015 | Graf et al. |
| 2003/0122429 A1 | 7/2003 | Zhang et al. |
| 2004/0123166 A1 | 6/2004 | Gauthier et al. |
| 2006/0198173 A1* | 9/2006 | Rozman ................ H02M 1/08 363/123 |
| 2009/0168859 A1 | 7/2009 | Tsubamoto et al. |
| 2011/0156678 A1* | 6/2011 | Saito ................ H01L 23/495 323/282 |
| 2011/0205680 A1* | 8/2011 | Kidd ................ G06F 1/26 361/93.2 |
| 2013/0106484 A1 | 5/2013 | Cyrusian |
| 2013/0117589 A1* | 5/2013 | Satyamoorthy ........ G06F 1/324 713/320 |
| 2014/0159684 A1* | 6/2014 | Lin ................ H02M 1/34 323/282 |
| 2015/0137857 A1* | 5/2015 | Kusama ................ H02M 1/08 327/109 |

\* cited by examiner

ADJUSTING SOURCE VOLTAGE BASED ON OPERATING VOLTAGE RESPONSE

BACKGROUND

Field

The disclosure relates generally to electronic circuits, in particular, to apparatuses and methods for adjusting source voltage based on operating voltage response.

Background

Increasingly, providing operating voltages to integrated circuits (ICs) is becoming an issue. For example, wireless communication technologies and devices (e.g., cellular phones, tablets, laptops, etc.) have grown in popularity and use over the past several years. These electronic apparatuses have grown in complexity and now commonly include multiple processors (e.g., baseband processor and application processor) and other resources that allow the users to execute complex and power-intensive software applications (e.g., music players, web browsers, video streaming applications, etc.). To meet the increasing performance demand, these processors have increased in complexity and operate in frequencies in the gigahertz range. As a result, the operating voltages of the IC would need to meet the various demands.

The operating voltage may be provided by a source voltage at a power supply. The source voltage may be set at a voltage margin above an operating voltage threshold to account for design and process variations. An operating voltage threshold or $V_{MIN}$ may be a minimum voltage at which a circuit may operate satisfactorily for various requirements (e.g. speed, function, power, etc.).

However, if the source voltage (e.g., the voltage margin) is set high above the operating voltage requirement, additional power may be consumed unnecessarily. As a result, battery life may be shortened, and additional heat may be produced while operating these processors. Accordingly, one design challenge is to adjust source voltage (e.g., the voltage margin) to meet the operating voltage requirement without excessive voltage margin at the source voltage.

SUMMARY

Aspects of a method for adjusting a source voltage at a power source are provided. The method includes changing a state from a first state to a second state comprising receiving an operating voltage from the power source through a power distribution network, measuring an operating voltage response to the changing state to receiving the operating voltage, and adjusting the source voltage at the power source based on the measured operating voltage response.

Aspects of an apparatus are disclosed. The apparatus includes a circuit configured to change state from a first state to a second state comprising receiving an operating voltage from a power source through a power distribution network, a sensor configured to measure an operating voltage response to the circuit changing state to receiving the operating voltage, and a control circuit configured to adjust a source voltage at the power source based on the operating voltage response measured by the sensor.

Aspects of another apparatus are provided. The apparatus includes a circuit configured to receive an operating voltage from a power source through a power distribution network, a sensor configured to measure an operating voltage response to the power source been applied to the circuit, and a control circuit configured to detect ringing in the operating voltage response and to adjust a source voltage based on the detected ringing.

Aspects of another apparatus are provided. The apparatus includes a circuit configured to receive an operating voltage from a power source through a power distribution network, a sensor configured to measure an operating voltage response to the power source been applied to the circuit, and a control circuit configured to detect a resonance frequency in the operating voltage response and to adjust a source voltage based on the resonance frequency.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The term "apparatus" shall be construed to include any integrated circuit or system, or any portion of an integrated circuit or system (e.g., modules, components, circuits, or the like residing in an integrated circuit or part of an integrated circuit). The term "apparatus" shall also be construed to include any intermediate product where an integrated circuit or system is combined with other integrated circuits or systems (e.g., a video card, a motherboard, a circuit board, etc.) or any end product (e.g., mobile phone, personal digital assistant (PDA), desktop computer, laptop computer, palm-sized computer, tablet computer, work station, game console, media player, computer based simulators, or the like). The term "method" shall similarly be construed to include the operation of any integrated circuit or system, or any portion of an integrated circuit or system, or any intermediate product or end product, or any step, process, algorithm, or the like, or any combination thereof performed by such integrated circuit or system (or portion thereof), intermediate product, or end product.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. A reference to a signal may be referred to the underlying signal line (e.g., a metal line on an IC) carrying the signal. A reference to a resistor may likewise be used to refer to the resistance of said resistor.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of the stated features, integers, steps, operations, elements, and/or components, but do not preclude the presence or addition of one or more other features, integers, steps, operations, elements, components, and/or groups thereof.

Various aspects of apparatuses and methods for adjusting a source voltage based on operating voltage responses will be presented with respect to a circuit board incorporating a processor IC for wireless communication and/or to a wireless communication system incorporating the circuit board. However, as those skilled in the art will readily appreciate, the various aspects of source voltage adjustment presented throughout this disclosure and their numerous applications are not limited thereto. For example, the aspects presented may be applicable to ICs other than a processor and applicable to functions beyond wireless communication. Accordingly, all references to a specific application for the presented apparatus or method are intended only to illustrate exemplary aspects of the apparatus or method with the understanding that such aspects may have a wide differential of applications.

Figure 1:
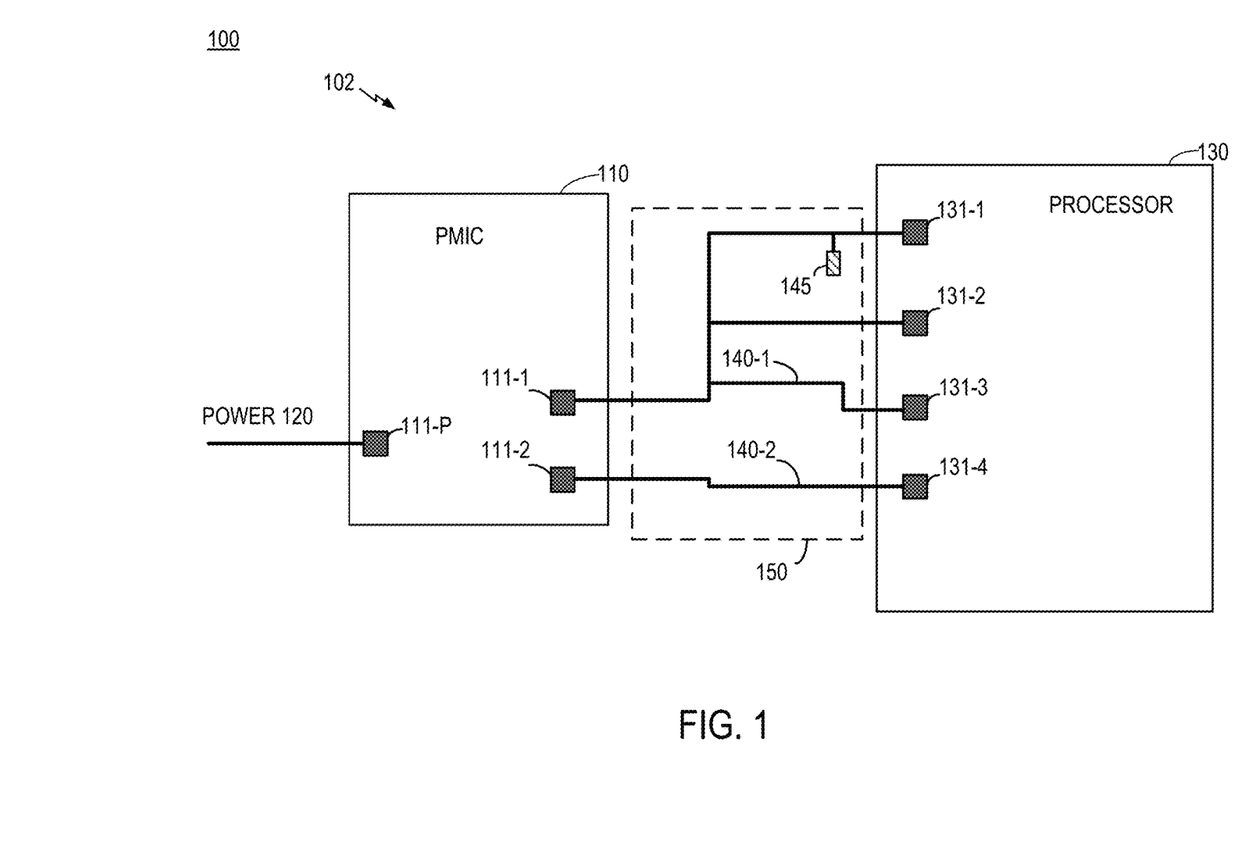
FIG. 1 is a diagram of an exemplary embodiment of an apparatus supplying an operating voltage via a power distribution network.

FIG. 1 is a diagram 100 of an exemplary embodiment of an apparatus 102 supplying an operating voltage via a power distribution network. In some examples, the apparatus 102 may be a circuit board for a wireless communication device, such as a cell phone. The apparatus 102 may include a power source in the example of a power management IC (PMIC) 110 and a circuit in the example of a processor 130 or cores of the processor 130. The apparatus 102 may further include a power distribution network (PDN) 150 through which the processor 130 receives operating voltage from the PMIC 110.

The PMIC is configured to receive power 120 from, for example, a battery. The power 120 may be provided to a connector 111-P of the PMIC 110. In some examples, the connector 111 (e.g., 111-P, 111-1, 111-2) may be a metal bump on the package of the PMIC 110. The PMIC 110 may include connectors 111-1 and 111-2 to output a source voltage 113 to other circuits, such as the processor 130 or circuits therein.

The processor 130 may be, for example, an application processor for the wireless communication device. The processor 130 may be on one or several substrates and may be within one or several packaged ICs. In some examples, the processor 130 may operate various subsystems, such as a camera unit, the modem, or a graphic processor unit of the wireless communication device. The processor 130 may include the connector 131 (e.g., 131-1-131-4) via which the operating voltage is received from the PMIC 110. In some examples, the connector 131 (e.g., 131-1-131-4) may be a metal bump on the package of the processor 130.

The connector 131 of the processor 130 is connected to the connector 111 of the PMIC 110 through the PDN 150. Thus, the processor 130 is configured to receive the operating voltage from the PMIC 110 through the PDN 150. The PDN 150 may include traces 140 (e.g., 140-1, 140-2) on the apparatus 102 (e.g., a circuit board). Each of the traces 140 may include one or more metal layers and the interconnects thereof. Moreover, the PDN 150 may include electronic elements, such as capacitors or inductors, coupled to the traces 140. In some examples, the PDN 150 includes the metal traces and the electronic elements on a board external to the semiconductor substrate of the PMIC or the semiconductor substrate of the processor 130.

Under static conditions (e.g. director current or DC), the source voltage 113 (see FIG. 2) outputted by the PMIC 110 via the connector 111 may be the same as the operating voltage 135 (see FIG. 2) received by the processor 130 via the connector 131. However, under dynamic conditions (e.g., when the processor 130 is operating at a frequency), the source voltage 113 outputted by the PMIC 110 may differ from the operating voltage 135 received by the processor 130. The differences may be due in part to the various electrical characteristics of the PDN 150. Accordingly, the source voltage 113 may be set or adjusted at a voltage margin above a needed operating voltage of the processor 130.

In some examples, the voltage margin may account for the various electrical characteristics of the PDN 150. For example, the physical layout and other physical characteristics (e.g., lengths, numbers of metal layers) of the traces 140 of the PDN 150 may affect the operating voltages received by the processor 130. For example, the trace 140-1 of the PDN 150 connects a connector 111-1 of the PMIC 110 to three connectors (131-1-131-3) of the processor 130. The current load on the trace 140-1 may thus differ from the current load on the trace 140-2. Moreover, the different lengths of the traces 140-1 and 140-2 may result in difference inductances of the traces 140-1 and 140-2.

Thus, the operating voltage, received via the trace 140-1 and the connector 131-1, may differ from the operating voltage received via the trace 140-2 and the connector 131-4. Moreover, the PDNs 150 on different circuit boards (e.g., from different manufacturers) may differ. To account for all the varying electrical characteristics of the PDNs 150 (such as the different traces 140), the voltage margin (e.g., the source voltage 113 outputted by the PMIC 110) may be set higher than necessary. Current consumption and heat generation may both be higher as a result.

The present disclosure provides exemplary embodiments which adjust the source voltages based on operating voltage responses. In some configurations, the disclosed exemplary embodiments set or adjust the source voltage 113 (e.g., reduce voltage margin) based on certain characteristics or parameters of the PDN 150 and produce current consumption and thermal management improvements.

Figure 2:
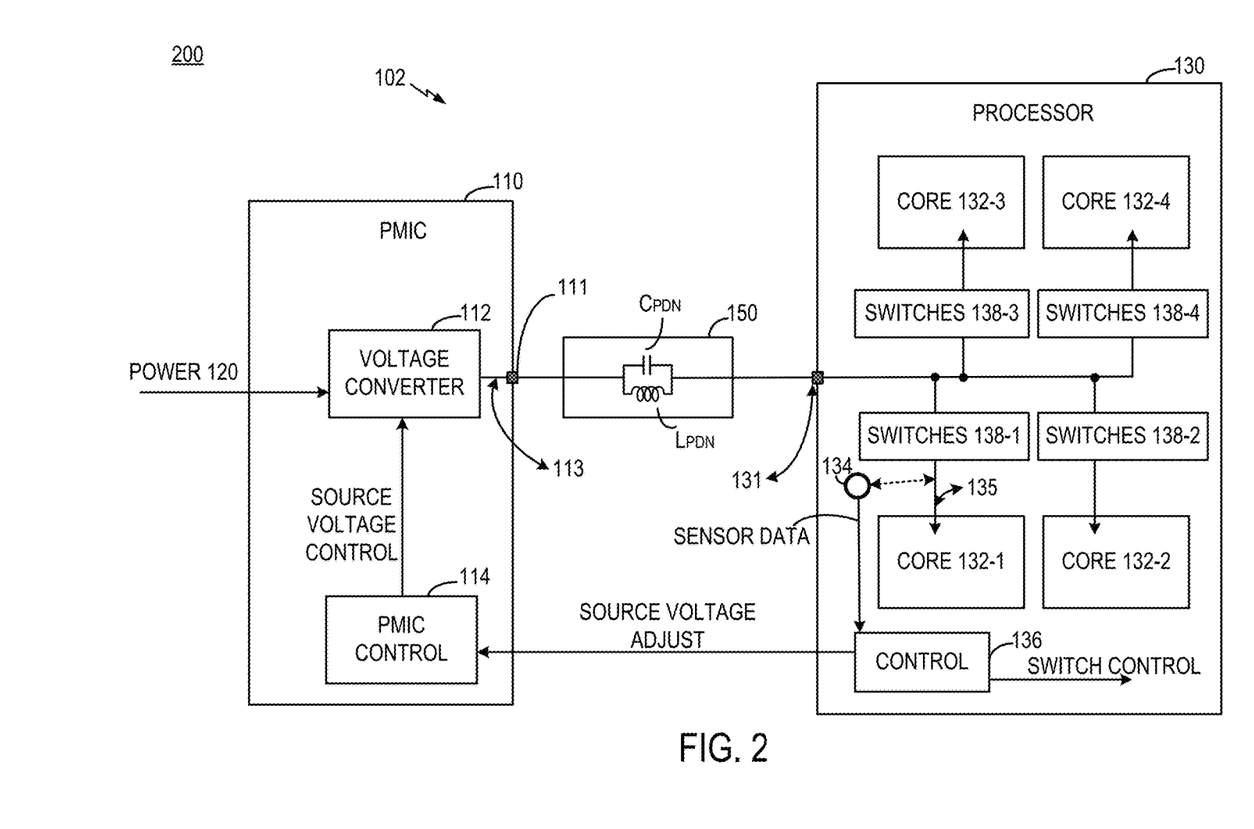
FIG. 2 is a functional block diagram of the apparatus of FIG. 1.

FIG. 2 is a functional block diagram 200 of the apparatus 102 of FIG. 1. The PMIC 110 includes a voltage converter 112 controlled by the PMIC control 114. The voltage converter 112 may be a buck converter and/or a low-dropout regulator. The voltage converter 112 receives power 120 and outputs source voltage 113 to the processor 130 via the connector 111 of the PMIC 110, the PDN 150, and the connector 131 of the processor 130. The source voltage 113 is set or adjusted by the SOURCE VOLTAGE CONTROL signal from the PMIC control 114.

The PDN 150 connects the connector 111 of the PMIC 110 and the connector 131 of the processor 130. In some examples, the PDN 150 is modeled with an inductor $L_{PDN}$ and a capacitor $C_{PDN}$. Accordingly, in some examples, the electrical characteristics of the PDN 150 include an inductance of $L_{PDN}$ and a capacitance of $C_{PDN}$. Greater details concerning the effects of the electrical characteristics of the PDN 150 are presented below with FIGS. 5 and 6.

The processor 130 may include cores 132 (132-1-132-4), a sensor 134, a control circuit 136, and switches 138 (138-1-138-4) via which the cores 132 receive operating voltages 135 (135-1-135-4). In some examples, a core may be a collection of circuit. In another example, a core may include a processor core or a central processing unit (CPU). Each of the cores 132 receives the respective operating voltage 135 from the PMIC 110 (the source voltage 113) via the connector 131.

In some examples, the sensor 134 and the control circuit 136 may be incorporated as part of one of the cores 132. In some example, the sensor 134 monitors the operating voltage 135-1 of the core 132-1. Additional sensors (which are not shown for clarity) may be included to monitor each of the operating voltages 135-1-135-4. The sensor 134 outputs the sensor data to the control circuit 136. Based on the sensor data, the control circuit 136 outputs the SOURCE VOLTAGE ADJUST signal to the PMIC control 114 of the PMIC 110 to set or adjust the source voltage 113. The control circuit 136 may also output the SWITCH CONTROL signal (e.g., SWITCH CONTROL-A and SWITCH CONTROL-B of FIG. 3) to control the operations of the switches 138.

Figure 3:
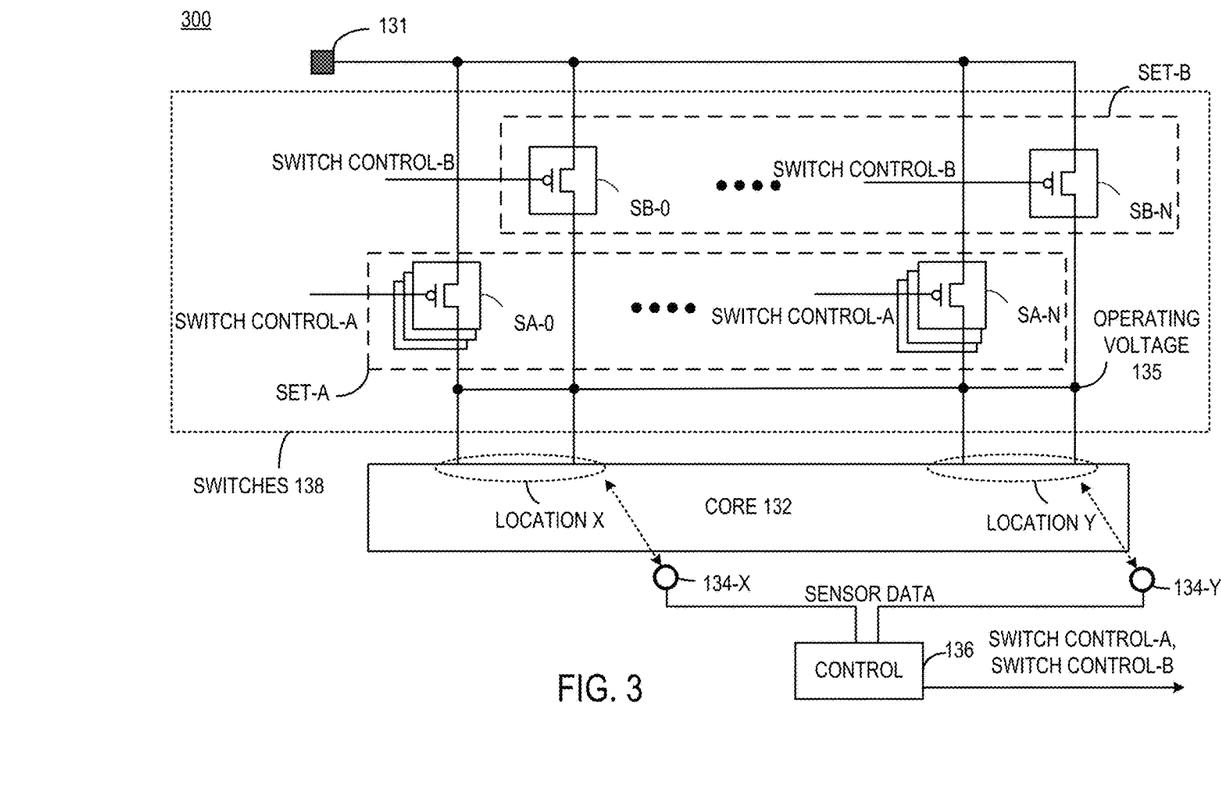
FIG. 3 is a diagram of exemplary embodiments of switches through which a core receives the operating voltage.

The switches 138 are presented with respect to FIG. 3. FIG. 3 is a diagram 300 of exemplary embodiments of switches 138 through which a core 132 receives the operating voltage 135. The switches 138 include a set SET-A that includes unit switches SA (SA-0-SA-N) and a set SET-B that includes the unit switches SB (SB-0-SB-N) coupling the connector 131 and the operating voltage 135, which is received by the core 132. Each of the unit switches (SA and SB) is depicted as a P-type transistor for illustration purpose only. In general, the switches 138 control the supply (e.g., to supply or not to supply) of the operating voltage 135 received by core 132.

The core 132 receives the operating voltage 135 at different locations, such as the location X and the location Y. The sensor 134-X is disposed at or near the location X and monitors or measures the operating voltage 135 at the location X. The sensor 134-Y is disposed at or near the location Y and monitors or measures the operating voltage 135 at the location Y. In some examples, the different locations X and Y are spaced apart such that the operating voltage response at the location X in response to an event (e.g., closing the switches 138) differ materially or meaningfully from the operating voltage response at the location Y to the event, as would be understood by persons of ordinary skill in the art. The sensor 134-X and the sensor 134-Y output the sensor data to the control circuit 136. For example, the sensor data may be the operating voltage 135 measured at the location X and/or the location Y.

The switches 138 are grouped into the set SET-A, which includes the unit switches SA, and grouped into the set SET-B, which includes the unit switches SB. In some examples, the number of the unit switches SA in the set SET-A may be greater than the number of the unit switches SB in the set SET-B. The unit switches SA in the set SET-A may be controlled by the SWITCH CONTROL-A signal from the control circuit 136. For example, the unit switches SA may be closed to connect or be opened to disconnect the connector 131 and the operating voltage 135 in response to the SWITCH CONTROL-A signal. Likewise, the unit switches SB in the set SET-B may be controlled by the SWITCH CONTROL-B signal from the control circuit 136. In some examples, the control circuit 136 may be configured to control (e.g. close or open) one of the sets of switches (SET-A and SET-B). The control circuit 136 may be further configured to control (e.g., close or open) both sets of switches SET-A and SET-B at one time. In some examples, the sensor 134 is configured to measure the operating voltage 135 in response to both sets of switches SET-A and SET-B close at the one time.

When one or both sets of switches SET-A and SET-B close, the core 132 changes its state from not receiving the operating voltage (e.g., the voltage at 135 is low or floating) to one that receives the operating voltage 135 from the PMIC 110 through the PDN 150. In response to one or both sets of switches SET-A and SET-B closing, an inrush current flows through the core 132. The inrush current may cause a voltage drop and ringing on the operating voltage 135. To reduce excessive voltage drop and ringing, the control circuit 136 may initially close the set SET-A switches for a powering up procedure, and close the set SET-B (having a greater number of the unit switches than the set SET-A) after a delay.

Figure 4A:
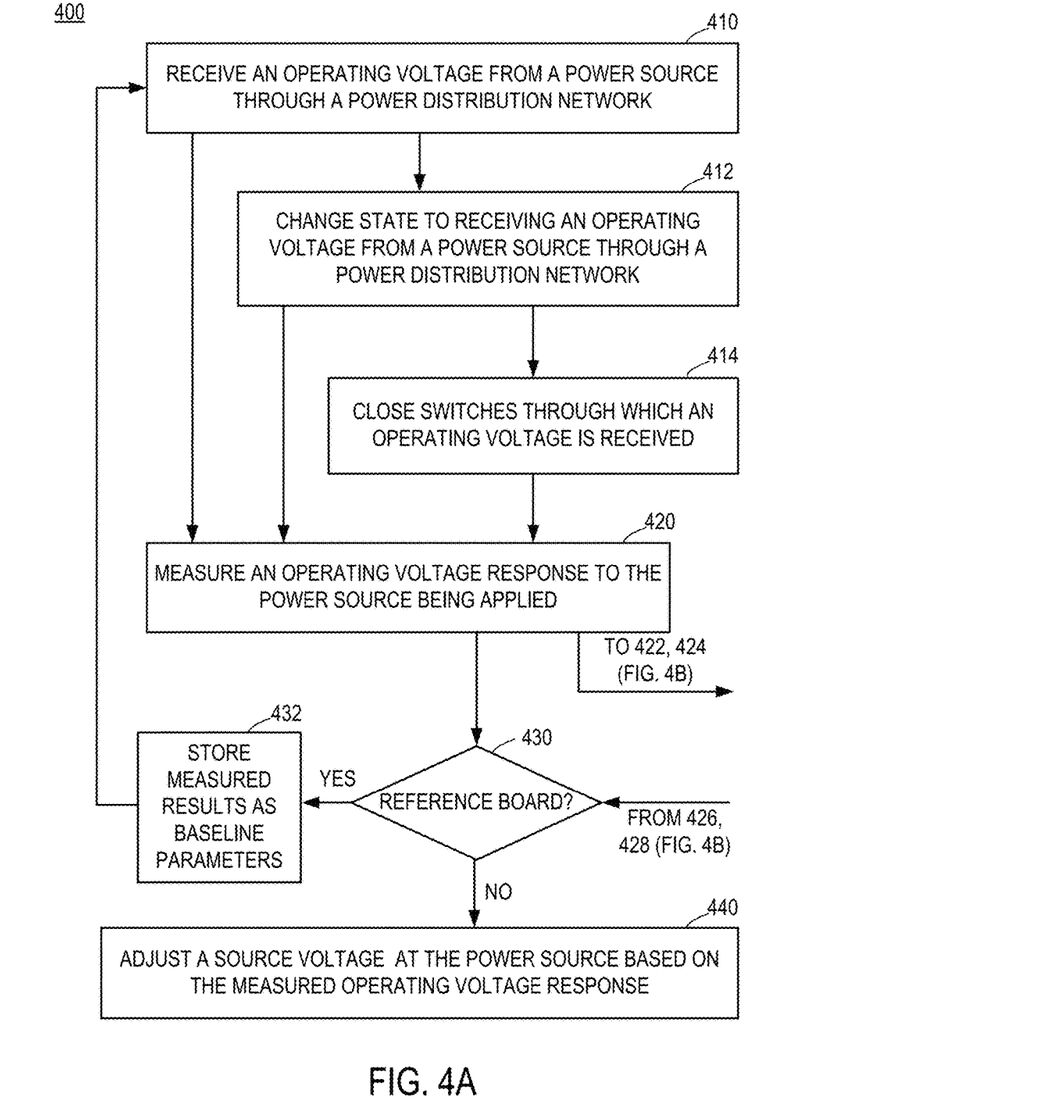
FIGS. 4A and 4B are a flow diagram illustrating operations of the apparatus of FIG. 1 adjusting an operating voltage received via a power distribution network.
Figure 4B:
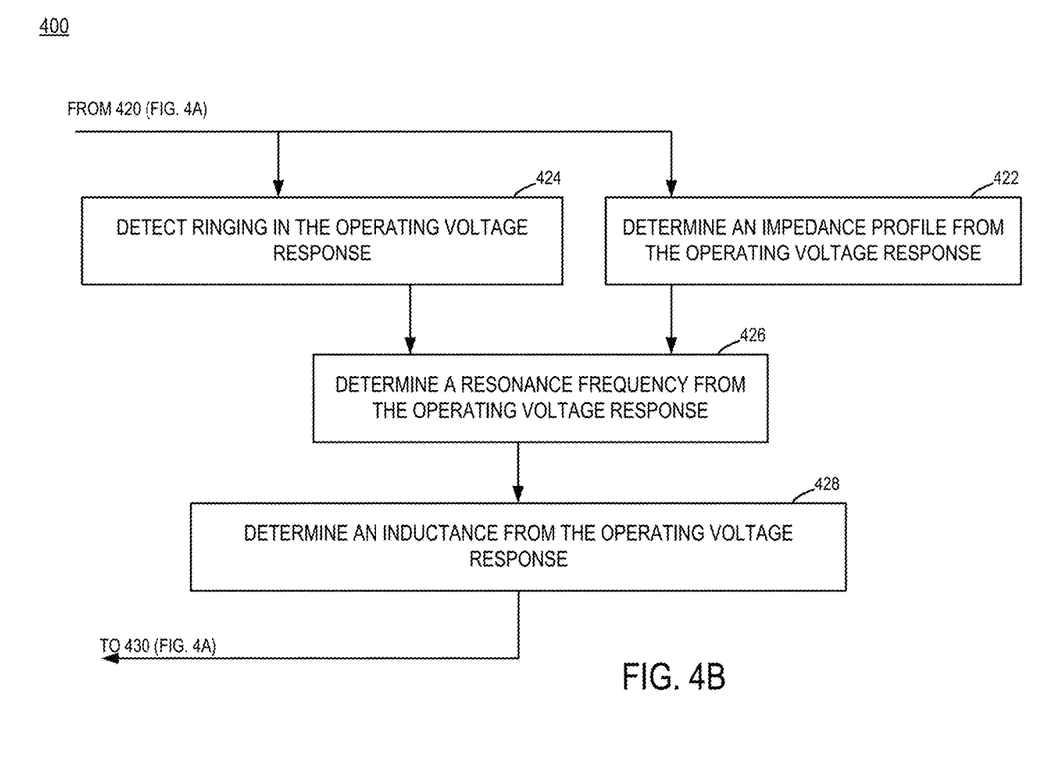

FIGS. 4A and 4B are a flow diagram illustrating operations of the apparatus of FIG. 1 adjusting an operating voltage received via a power distribution network. The steps may be performed by the control circuit 136 as part of the apparatus 102 or the processor 130, as described with FIGS. 1-3.

At 410, an operating voltage is received from a power source through a power distribution network. For example, the core 132 receives the operating voltage 135 through the PDN 150. At 412, the core 132 changes its state to receiving an operating voltage from a power source through the power distribution network. For example, the core 132 changes state from a first state to a second state that receives an operating voltage 135 from a power source PMIC 110 through The PDN 150. The first state may be one receiving the operating voltage 135 from another power source or not receiving an operating voltage.

At 414, switches through which the operating voltage is received are closed. Referring to FIG. 3, the core 132 receives the operating voltage 135 through switches 138, which are arranged as sets of switches SET-A and SET-B. The control circuit 136 outputs the SWITCH CONTROL-A signal to control the set of switches SET-A and outputs the SWITCH CONTROL-B signal to control the set of switches SET-B. In some examples, the control circuit 136 may output the SWITCH CONTROL-A and the SWITCH CONTROL-B signals to close both sets of switches SET-A and SET-B at one time to supply the operating voltage 135. In response, the core 132 changes its state (e.g., operating state) from not receiving an operating voltage to receiving the operating voltage 135 from the PMIC 110 through the PDN 150.

At 420, an operating voltage response to the power source being applied is measured. In some examples, referring to FIG. 3, the sensor 134 may be a voltage sensor and monitor the operating voltage 135. The control circuit 136 may receive the sensor data from the sensor 134 and measure the operating voltage response to the power source (e.g., the PMIC 110) being applied to the core 132. In some examples, multiple sensors 134 may be placed in different locations (see FIG. 3, sensor 134-X and sensor 134-Y). The control circuit 136 may receive the sensor data from the sensors 134 and average the data for the measurement.

In some examples, the measured operating voltage response may be responses to the closing the switches 138 through which the operating voltage 135 is received or to the core changing its state to receiving the operating voltage 135 from the PMIC 110 through the PDN 150. Examples of the operating voltage response measurements are described with 422, 424, 426, and 428.

Figure 5:
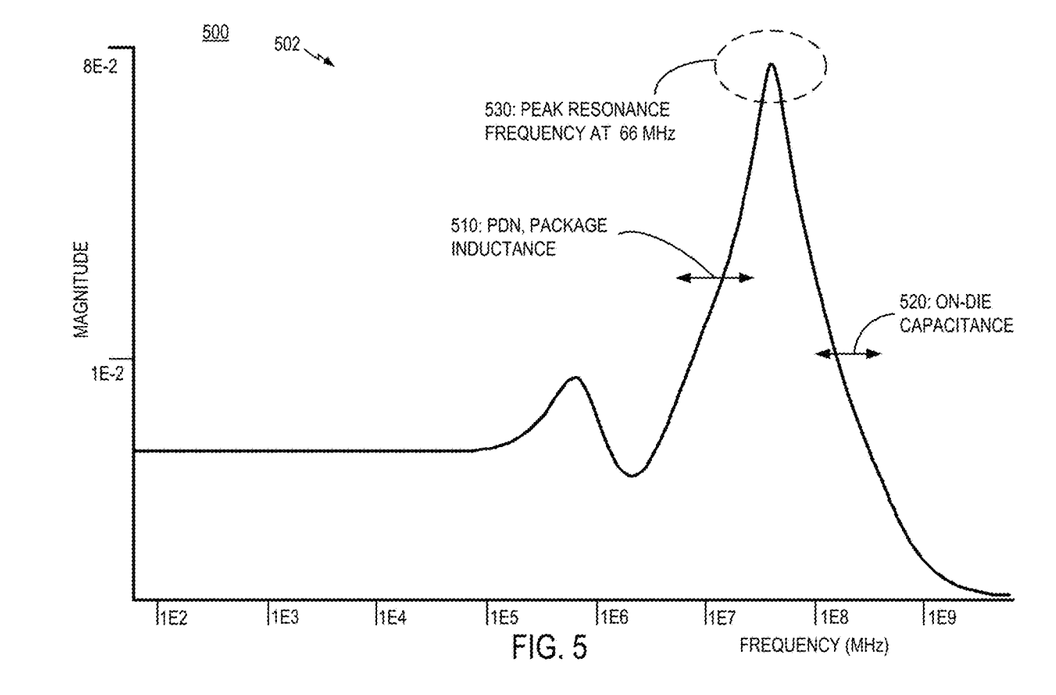
FIG. 5 is a diagram of an impedance profile determined from an operating voltage response.

At 422, an impedance profile is determined from the operating voltage response. FIG. 5 is a diagram 500 of an impedance profile 502 determined from an operating voltage response. In some examples, the control circuit 136 may determine the impedance profile 502 from the voltages of the operating voltage 135 and the corresponding currents drawn by the core 132 over an operating frequency range. Referring to FIG. 5, the impedance profile 502 includes a peak resonance frequency of 66 MHz at 530. An edge 510 of the impedance profile 502 may be affected mostly by the inductance of the PDN 150 (e.g., $L_{PDN}$) and an inductance of a package of the processor 130 (which may be characterized from the package and would be known). An edge 520 of the impedance profile 502 may be affected mostly by an on-die capacitance of the processor 130 (which might be determined from simulation and therefore would be known).

Figure 6:
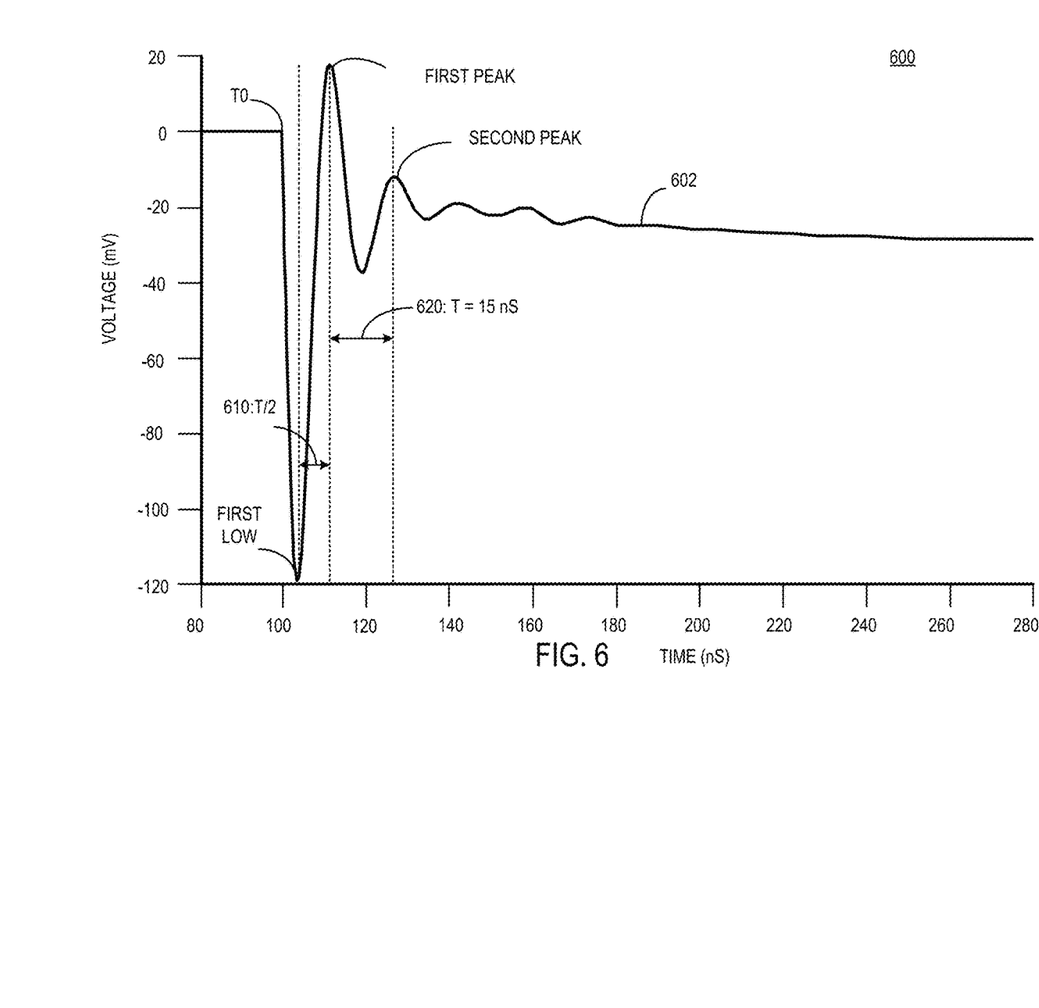
FIG. 6 is a diagram of ringing detected from an operating voltage response.

At 424, ringing in the operating voltage response is detected. FIG. 6 is a diagram 600 of ringing detected from an operating voltage response 602. In some examples, the control circuit 136 may detect ringing in the operating voltage response 602, which may be captured by the sensor 134. Referring to FIG. 6, at T0, the control circuit 136 may detect ringing (e.g., first low, first peak, second peak, etc.) in response to the core 132 changing its state (e.g., operating state) from not receiving an operating voltage to receiving the operating voltage 135 from the PMIC 110 through the PDN 150, or in response to the switches 138 closing. In some examples, the control circuit 136 may detect a period of the peak resonance frequency "T" by detecting a first-low-to-first-peak 610 as T/2 in the operating voltage response 602. In some examples, the control circuit 136 may detect the period T by detecting a first-peak-to-second peak 620 operating voltage response 602.

At 426, a resonance frequency is determined from the operating frequency response. In some examples, the control circuit 136 may determine a peak resonance frequency at 530 from the impedance profile 502 (which is determined from an operating voltage response, as described with 422). In some examples, the control circuit 136 may determine a peak resonance frequency by determining its period T/2 at 710 or period T at 720 from the operating voltage response 602 (as described with 424).

At 428, an inductance is determined from the operating frequency response. In some examples, the control circuit 136 may determine an inductance of the PDN 150, $L_{PDN}$, from an operating voltage response. In some examples, $L_{PDN}$ may be determined as:

$$L_{PDN} = \frac{1}{4} \times \pi^2 (1/T) \times C_{DIE} - L_{PKG},$$

where T is the period of the peak resonance frequency, $C_{DIE}$ is the on-die capacitance of the processor 130, and $L_{PKG}$ is the inductance of the package of the processor 130. $C_{DIE}$ and $L_{PKG}$ may be known parameters. $C_{DIE}$ may be determined by simulation from a layout of the processor 130. $L_{PKG}$ may be determined by characterization of the package itself. In some examples, T may be determined from ringing in an operating voltage response (e.g., 424, 426, and 428). In some examples, T may be determined from an impedance profile, which is determined an operating voltage response (e.g., 422, 426, and 428).

At 430, whether the apparatus 102 is a reference board is determined. In some examples, the apparatus 102 may be a reference board with a known PDN 150, and, the flow goes to 432. At 432, the measurement results are stored as baseline parameter. For example, the impedance profile 502, the resonance frequency 530, the period T, or the inductance $L_{PDN}$ may be stored as baseline parameter or parameters for future references. In some examples, the stored value may include a table of various source voltage settings and corresponding parameters (e.g., the resonance frequency 530, the period T, or the inductance $L_{PDN}$) for satisfactory performance. These source voltage settings allow a core 132 to receive the operating voltage 135 which is at a voltage margin above the threshold voltage $V_{MIN}$, through a PDN 150 having the corresponding parameter or parameters (e.g., the resonance frequency 530, the period T, or the inductance $L_{PDN}$). The flow then returns to 410, in some example, to characterize a production board with an unknown PDN 150.

In some examples, the apparatus 102 may not be a reference board, but a production board with a PDN 150 of unknown parameters (e.g., the resonance frequency 530, the period T, or the inductance $L_{PDN}$ being unknown). For example, the apparatuses 102 may be from various manufacturers with different PDNs 150. The flow may then go to 440 to adjust the source voltage 113 at the power source (e.g., PMIC 110) based on the measurement results of operating voltage responses of operating voltages received through the different PDNs 150.

At 440, the source voltage at the power source is adjusted based on the measured operating voltage response. For example, the impedance profile 502, resonance frequency 530, period T, or inductance $L_{PDN}$ determined from a measure voltage response (e.g., the operating voltage response 602) may be compared to the stored values obtained from a reference board (e.g., obtained at 432) to adjust the source voltage 113. In some examples, the control circuit 136 may compare the determined impedance profile 502, resonance frequency 530, period T, or inductance $L_{PDN}$ and match them with the stored values. The control circuit 136 may output the SOURCE VOLTAGE ADJUST signal to adjust the source voltage 113 at the PMIC 110 to a setting corresponding to the matched impedance profile 502, resonance frequency 530, period T, or inductance $L_{PDN}$. In this fashion the selected source voltage setting at the PMIC 110 is tailored for each PDN 150, and the voltage margin to the operating voltage, due to tailoring of the PDN 150, may likewise be reduced.

Figure 7:
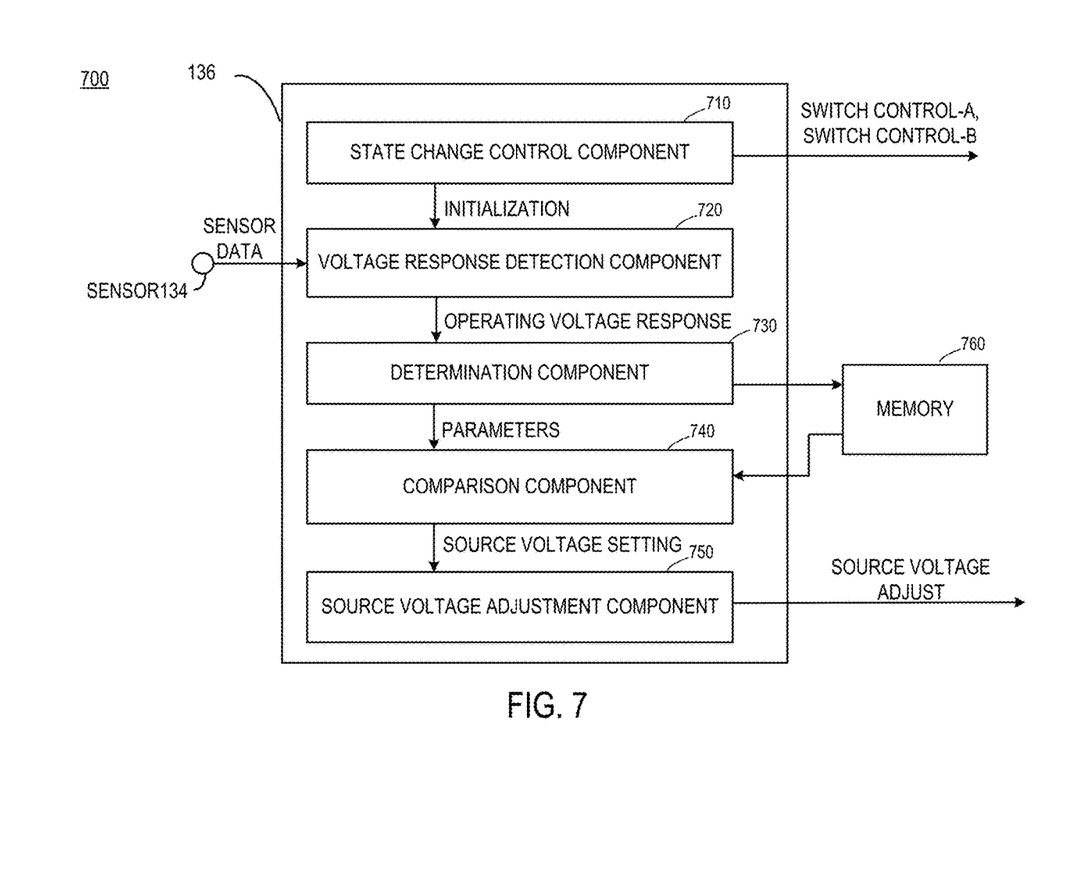
FIG. 7 a block diagram of an exemplary embodiment of a control circuit.

FIG. 7 is a block diagram 700 of an exemplary embodiment of a control circuit 136. The control circuit 136 may be an exemplary embodiment of a hardware implementation of the control circuit and may include various (e.g., hardware) components. The control circuit 136 may be part of processor 130 or external to the processor 130, either in whole or part. To the extent that the control circuit 136, or any portion thereof, is implemented external to the processor, it may be implemented in any part of the apparatus 102 or external to the apparatus 102. In one example, theses components described below may include instructions executed by one of the cores 132-1-132-4 of the processor 130.

In an exemplary embodiment, the control circuit 136 and the components contained therein, presented below, may include circuits, processor or processors, software executing on the processor or processors, or combinations thereof. These components may include circuits for generating the signals for the functions described infra or signal lines carrying those signals.

By way of example, a component, or any portion of a component, or any combination of components may be implemented with one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The control circuit 136 includes a state change control component 710, a voltage response detection component 720, a determination component 730, a comparison component 740, and a source voltage adjustment component 750. In some examples, the state change control component 710 may control the switches 138 through which the core 132 may receive an operating voltage from the PMIC 110, the switches 138 being arranged as the set of switches SET-A and the set of switches SET-B. The state change control component 710 may be configured to output the SWITCH CONTROL-A and the SWITCH CONTROL-B signals to control the set of switches SET-A and the set of switches SET-B, respectively. In some examples, the state change control component 710 may activate both the SWITCH CONTROL-A and the SWITCH CONTROL-B signals at one time to close both set of switches. The core 132, in response, changes its state from not receiving an operating voltage (e.g., the PMIC is not applied to the core 132) to receiving the operating voltage 135 (e.g., the PMIC is applied to the core 132 via the switches 138) from the PMIC 110 through the PDN 150.

The voltage response detection component 720 may receive an initialization from the state change control component 710 indicating that the core 132 has changed state to receiving the operating voltage 135 from the PMIC 110 through the PDN 150 or that the PMIC 110 is applied to the core 132. In response, the voltage response detection component 720 may monitor the sensor data from the sensor 134, which monitors the voltages of the operating voltage 135. The voltage response detection component 720 may output the measurement results, which may include operating voltage response (e.g., operating voltage response 602) or various data of the operating voltage response (e.g., the first low, first peak, second peal, etc.), to the determination component 730.

The determination component 730 may output various parameters determined from the measurement results received from the voltage response detection component 720. In some examples, the determination component 730 may receive measurement results from multiple sensors 134 and average the measurement results, and base upon which determine the parameters. In some examples, referring to FIGS. 4-7, the parameters may include the impedance profile 502, the resonance frequency 530, the period T, or the inductance $L_{PDN}$. In cases where the apparatus 102 is a reference board, these parameters may be stored in memory 760 as baseline parameters. The memory 760 may be part of apparatus 102 or the processor 130. In some example, the memory 760, such as a database, may be external to the apparatus 102.

In some examples, the impedance profile 502, the resonance frequency 530, the period T, or the inductance $L_{PDN}$ may be saved as a table of various source voltage settings and corresponding parameters (e.g., the resonance frequency 530, the period T, or the inductance $L_{PDN}$) which allow the core 132 to operate satisfactorily. These source voltage settings allow a core 132 to receive the operating voltage 135, which may be at a voltage margin above the threshold voltage $V_{MIN}$, through a PDN 150 having the corresponding parameter or parameters (e.g., the resonance frequency 530, the period T, or the inductance $L_{PDN}$). In examples where the apparatus 102 is a production board, these parameters are provided to the comparison component 740.

The comparison component 740 may compare the parameters (e.g., the resonance frequency 530, the period T, or the inductance $L_{PDN}$) of a production board with the baseline parameters stored in the aforementioned table in the memory 760. In some examples, the comparison component 740 may select source voltage settings in the table having corresponding parameters that best match the parameters of the production board. The comparison component 740 may provide the selected source voltage settings to the source voltage adjustment component 750.

The source voltage adjustment component 750 may generate the SOURCE VOLTAGE ADJUST signal based on the received source voltage settings. The SOURCE VOLTAGE ADJUST signal may be provided to the PMIC 110 to adjust the outputted source voltage 113.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented. The methods disclosed herein comprise one or more steps or actions for achieving the described method. The method steps and/or actions may be interchanged with one another without departing from the scope of the claims.

In other words, unless a specific order of steps or actions is specified, the order and/or use of specific steps and/or actions may be modified without departing from the scope of the claims. For example, the steps may be implemented by circuits to perform the functions described herein and/or circuits generating the signals for the functions described herein, or combinations thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for.

What is claimed is:

1. An apparatus, comprising:
a circuit configured to change state from not receiving an operating voltage to receiving an operating voltage from a power source through a power distribution network;
a sensor configured to measure an operating voltage response to the circuit changing state to receiving the operating voltage;
a control circuit configured to adjust a source voltage at the power source based on ringing in the operating voltage response measured by the sensor, the control circuit further configured to reduce ringing in the operating voltage response based on the operating voltage response measured by the sensor; and
a plurality of switches through which the circuit receives the operating voltage, wherein the circuit is configured to change state in response to the control circuit closing the switches, wherein the control circuit is further configured to initially close a first set of the plurality of switches followed by closing a second set of the plurality of switches after a delay to reduce ringing, wherein the second set of the plurality of switches having a greater number of unit switches.

2. The apparatus of claim 1, wherein the control circuit is further configured to adjust the source voltage at the power source based on resonance frequency of the operating voltage response.

3. The apparatus of claim 2, wherein the control circuit is further configured to adjust the source voltage at the power source by determining an inductance from the operating voltage response and adjusting the source voltage based on the inductance.

4. The apparatus of claim 1, wherein:
the circuit is configured to change state to receiving the operating voltage in response to both sets of switches close at the one time.

5. The apparatus of claim 1, further comprising a plurality of sensors, including the sensor, disposed in different locations and configured to measure operating voltage responses in the different locations, wherein the control circuit is configured to adjust the source voltage at the power source based on an average of the operating voltage responses.

6. The apparatus of claim 1, wherein the control circuit is further configured to adjust the source voltage at the power source based on an impedance profile determined from the operating voltage response.

7. The apparatus of claim 6, wherein the control circuit is further configured to determine the impedance profile over a range of operating frequencies of the circuit.

8. The apparatus of claim 1, wherein the control circuit characterizes the power distribution network and adjusts a voltage margin based on characteristics of the power distribution network.

9. A method to adjust a source voltage, comprising:
changing a state from not receiving an operating voltage to receiving an operating voltage from a power source through a power distribution network;
measuring an operating voltage response to the changing state to receiving the operating voltage;
adjusting the source voltage at the power source based on ringing in the operating voltage response, and reducing ringing in the operating voltage response based on the measuring of the operating voltage response; and
wherein the changing state comprises closing a plurality of switches through which the operating voltage is received, including initially closing a first set of the plurality of switches followed by closing a second set of the plurality of switches after a delay to reduce ringing, wherein the second set of the plurality of switches having a greater number of unit switches.

10. The method of claim 9, wherein the adjusting the source voltage at the power source is based on resonance frequency of the operating voltage response.

11. The method of claim 10, further comprising determining an inductance from the operating voltage response, wherein the adjusting the source voltage at the power source is based on the inductance.

12. The method of claim 9, comprising measuring operating voltage responses in different locations, wherein the adjusting the source voltage at the power source is based on an average of the operating voltage responses.

13. The method of claim 9, further comprising determining an impedance profile determined from the operating voltage response, wherein the adjusting the source voltage at the power source is based on the determined impedance profile.

14. The method of claim 13, wherein the impedance profile is determined over a range of operating frequencies.

15. An apparatus, comprising:
a circuit configured to receive an operating voltage from a power source through a power distribution network;
a sensor configured to measure an operating voltage response to the power source having been applied to the circuit;
a control circuit configured to detect ringing in the operating voltage response and to adjust a source voltage based on the detected ringing to reduce ringing in the operating voltage response; and
a plurality of switches through which the circuit receives the operating voltage, wherein the sensor is further configured to measure the operating voltage response when the power source is applied to the circuit by the control circuit closing each of the switches, wherein the control circuit is further configured to initially close a first set of the plurality of switches followed by closing a second set of the plurality of switches after a delay to reduce ringing, wherein the second set of the plurality of switches having a greater number of unit switches.

16. The apparatus of claim 15, wherein the control circuit is further configured to adjust the source voltage at the power source based on resonance frequency determined from the ringing in the operating voltage response.

17. The apparatus of claim 15, wherein the control circuit is further configured to adjust the source voltage at the power source by determining an inductance from the ringing and adjusting the source voltage based on the inductance.

18. The apparatus of claim 15, wherein:
the sensor is configured to measure the operating voltage response in response to both sets of switches close at the one time.

19. The apparatus of claim 15, further comprising a plurality of sensors, including the sensor, disposed in different locations and configured to measure operating voltage responses in the different locations, wherein the control circuit is configured to adjust the source voltage at the power source based on an average of the operating voltage responses.

20. An apparatus, comprising:
a circuit configured to receive an operating voltage from a power source through a power distribution network;
a sensor configured to measure an operating voltage response to the power source having been applied to the circuit;
a control circuit configured to detect a resonance frequency in the operating voltage response and a second peak, and to adjust a source voltage based on the resonance frequency to reduce ringing in the operating voltage response based on the resonance frequency; and
a plurality of switches through which the circuit receives the operating voltage, wherein the sensor is further configured to measure the operating voltage response when the power source is applied to the circuit by the control circuit closing each of the switches, wherein the control circuit is further configured to initially close a first set of the plurality of switches followed by closing a second set of the plurality of switches after a delay to reduce ringing, wherein the second set of the plurality of switches having a greater number of unit switches.

21. The apparatus of claim 20, wherein the control circuit is further configured to adjust the source voltage at the power source by determining an inductance from the operating voltage response and adjusting the source voltage based on the inductance.

22. The apparatus of claim 20, wherein:
the sensor is configured to measure the operating voltage response in response to both sets of switches close at the one time.

* * * * *